Sept. 15, 1942.  R. TAMPIER  2,296,124

BALL JOINT

Filed May 31, 1940

INVENTOR
René Tampier
BY
ATTORNEY

Patented Sept. 15, 1942

2,296,124

UNITED STATES PATENT OFFICE 2,296,124

BALL JOINT

René Tampier, Cricklewood, London, England

Application May 31, 1940, Serial No. 338,215
In Great Britain June 17, 1939

1 Claim. (Cl. 287—90)

This invention relates to ball joints of the kind comprising a casing having a socket to receive the ball which is carried on one end of a spindle, the other end of which is screw threaded to constitute a connecting element, means acting normally to lock or retain the ball in the socket and means permitting of removing the ball when desired.

In ball joints of this kind as previously proposed, a single aperture has been provided in the wall of the casing to receive the ball, and through which the ball spindle projects. The direction of projection of the ball spindle is thus limited by the location of the aperture in the casing.

The object of the present invention is to provide means for enabling the spindle to project from the casing in more than one direction.

The invention is illustrated in the accompanying drawing wherein—

Figure 1:
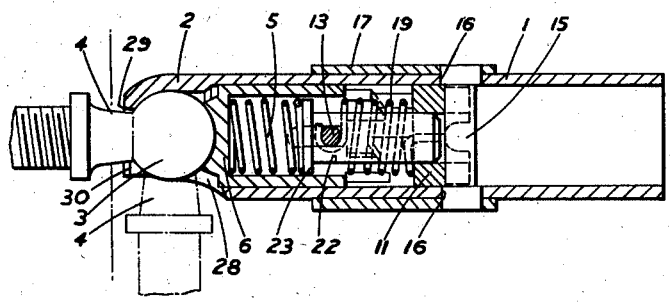
Figure 1 is a side elevation partly in section.
Figure 2:
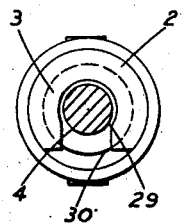
Figure 2 is a section taken on line II—II, Figure 1.

In the drawing, 1 is a tubular casing having one end formed as a ball socket 2 adapted to receive a ball 3 carried on the end of a spindle 4.

A compression spring 5 disposed in a hollow block 6 having a spherical surface at one end presses the spherical surface of the block against the ball. The ball can be locked in its socket by means of a locking device comprising four helically shaped surfaces 7 formed on the outer ends of tooth-like projections 8 on the block 6, which surfaces co-operate with similar helically shaped surfaces 9 formed on the ends of tooth-like projections 10 on a second block 11. The block 6 is slidable axially in the casing 1 by reason of two oppositely disposed recesses 12 in its wall which engage on a pin 13 extending transversely of the casing 1, and carried in the wall thereof.

This arrangement permits of axial sliding movement of the block 6, but prevents the latter rotating in the casing 1. On the other hand, the block 11 is rotatably mounted in the casing 1 but is not slidable axially therein. To this end the block 11 has a pair of oppositely disposed recesses 14 which are engaged by a pin 15 mounted in oppositely disposed slots 16 in the casing 1, which slots are arranged to permit the pin to be rocked in a plane transverse to the casing, but to prevent any substantial axial movement thereof relatively to the casing. The ends of the pin 15 are rigid with a knurled sleeve 17 rotatably mounted on the casing 1, the arrangement being such that rotation of the sleeve 17 rocks the pin 15 in the slots 16.

The block 11 is placed under torsion by a torsion spring 19 one end of which is connected to the pin 13, and the other end of which is anchored in a hole drilled in the base of the block 11, which is also bored centrally to receive one end of a guide pin 22 for the spring 19, the other end of the pin 22 being formed with an enlarged piston-like head 23, which constitutes an abutment for the compression spring 5.

Figure 3:
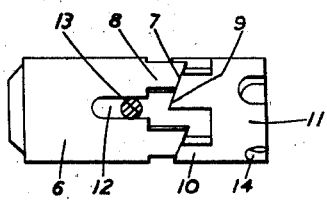
Figure 3 is a side elevation of the locking device in its locking position.

The arrangement is such that the torsion spring 19 normally tends to rotate the block 11 in the casing 1, thus causing the helical surfaces 9 to bear against the helical surfaces 7. Since the block 6 is free to slide axially, whilst the block 11 is fixed axially it will readily be evident that the torsion spring 19 will provide an axial pressure on the block 6 additional to the pressure exerted by the compression spring 5, and this additional pressure provides for effectively locking the ball 3 in the socket 2, so that it cannot be released from its socket. The positions of the parts 6 and 11 corresponding to this locking of the ball are shown in Figure 3.

Figure 4:
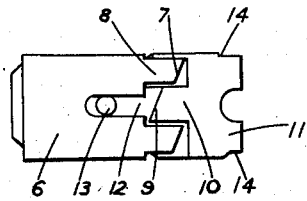
Figure 4 is a view similar to Fig. 3 showing the locking device in its unlocking position.

If now it is desired to remove the ball from its socket the sleeve 17 is rotated against the action of the spring 19, in order to rotate the block 11 into a position in which the teeth 10 are in line with the gaps between the teeth 8. In this position an outward pull on the spindle 4 will slide the block 6 to the right and permit the ball to be removed since the teeth on the block 6 can now engage in the gaps between the teeth on the block 11. This position of the parts is clearly shown in Figure 4. Any other desired construction of locking device and operating member may be used, for example, the various cam devices described in my British patent specification No. 406,491.

The present invention is concerned solely with the provision, in the kind of ball joint above specified, of more than one aperture through any one of which the spindle 4 of the ball 3 can be caused to project.

As shown in the drawing, the ball is inserted into the socket 2 through an aperture 28 in the side wall of the casing disposed contiguous to the ball socket. A second aperture 29 is provided in the end of the casing 1 and is connected with the aperture 28 by means of a slot 30 which is wide enough to permit passage of the neck of the spindle 4.

In the arrangement described the spindle 4 can project either through the aperture 28 in the side wall of the casing, as shown in dot-and-dash lines Figure 1, or the spindle may be passed through the slot 30 so as to project through the aperture 29 axially in line with the casing 1 as shown in full lines.

What I claim is:

In a ball joint, a casing having a socket, said socket having two apertures in its wall, one of which is offset and the other axial, relatively to the casing, said axial aperture being of smaller diameter than the ball but large enough to permit the ball spindle to pass therethrough, and said offset aperture having a diameter large enough to permit the ball to be passed therethrough, said two apertures being connected by a slot, a ball adapted to be located in said socket, a spindle on one end of which the ball is carried and the other end of which is screw threaded to constitute a connecting element, said spindle being movable in said slot and adapted to project through either the offset or radial aperture, spring-pressed means for resiliently holding the ball in the socket, locking means acting normally to retain the ball in the socket, and a sleeve rotatably mounted on the said casing and operatively connected to said locking means, operation of said sleeve permitting of removing the lock on the ball when it is desired to remove it from the socket.

RENÉ TAMPIER.